United States Patent
Hanya et al.

(10) Patent No.: US 8,804,266 B2
(45) Date of Patent: Aug. 12, 2014

(54) DOUBLE SERVO TYPE MAGNETIC DISC APPARATUS

(75) Inventors: Masao Hanya, Aiko-gun (JP); Keiji Aruga, Machida (JP)

(73) Assignees: NHK Spring Co., Ltd., Yokohama-shi, Kanagawa (JP); Aruga Research LLC, Machida-shi, Tokyo (JP)

( * ) Notice: Subject to any disclaimer, the term of this patent is extended or adjusted under 35 U.S.C. 154(b) by 142 days.

(21) Appl. No.: 13/357,798

(22) Filed: Jan. 25, 2012

(65) Prior Publication Data

US 2012/0200953 A1     Aug. 9, 2012

(30) Foreign Application Priority Data

Feb. 8, 2011 (JP) ................................. 2011-025079

(51) Int. Cl.
   *G11B 21/02* (2006.01)
(52) U.S. Cl.
   USPC .............................................. 360/55; 360/75
(58) Field of Classification Search
   CPC ...................................................... G11B 5/556
   See application file for complete search history.

(56) References Cited

U.S. PATENT DOCUMENTS

| | | | | |
|---|---|---|---|---|
| 5,677,809 A * | 10/1997 | Kadlec | ...................... | 360/78.09 |
| 6,424,486 B2 * | 7/2002 | Heaton et al. | .............. | 360/78.05 |
| 6,483,659 B1 * | 11/2002 | Kobayashi et al. | ........ | 360/78.04 |
| 7,173,790 B2 * | 2/2007 | Kobayashi et al. | ........ | 360/78.05 |
| 2002/0012193 A1 * | 1/2002 | Kobayashi et al. | ........ | 360/78.05 |
| 2006/0061902 A1 * | 3/2006 | Sharma et al. | ............. | 360/77.02 |
| 2009/0310250 A1 * | 12/2009 | Nagashima et al. | ....... | 360/77.04 |

FOREIGN PATENT DOCUMENTS

JP     2001-307442 A     11/2001

* cited by examiner

*Primary Examiner* — Wayne Young
*Assistant Examiner* — Mark Fischer
(74) *Attorney, Agent, or Firm* — Holtz Holtz Goodman & Chick PC

(57) ABSTRACT

According to one embodiment, a magnetic disc apparatus includes a magnetic head which reads information stored in a magnetic disc, an arm which supports the magnetic head, and a feedback controller which controls a coarse actuator to move the magnetic head above the magnetic disc by driving the arm, a fine actuator to hold a position of the magnetic head, and a feedback path which feeds back a displacement of the actuator to a target value of the coarse actuator. The feedback controller controls decoupling of a double actuator system which adds up the coarse actuator and the fine actuator.

6 Claims, 9 Drawing Sheets

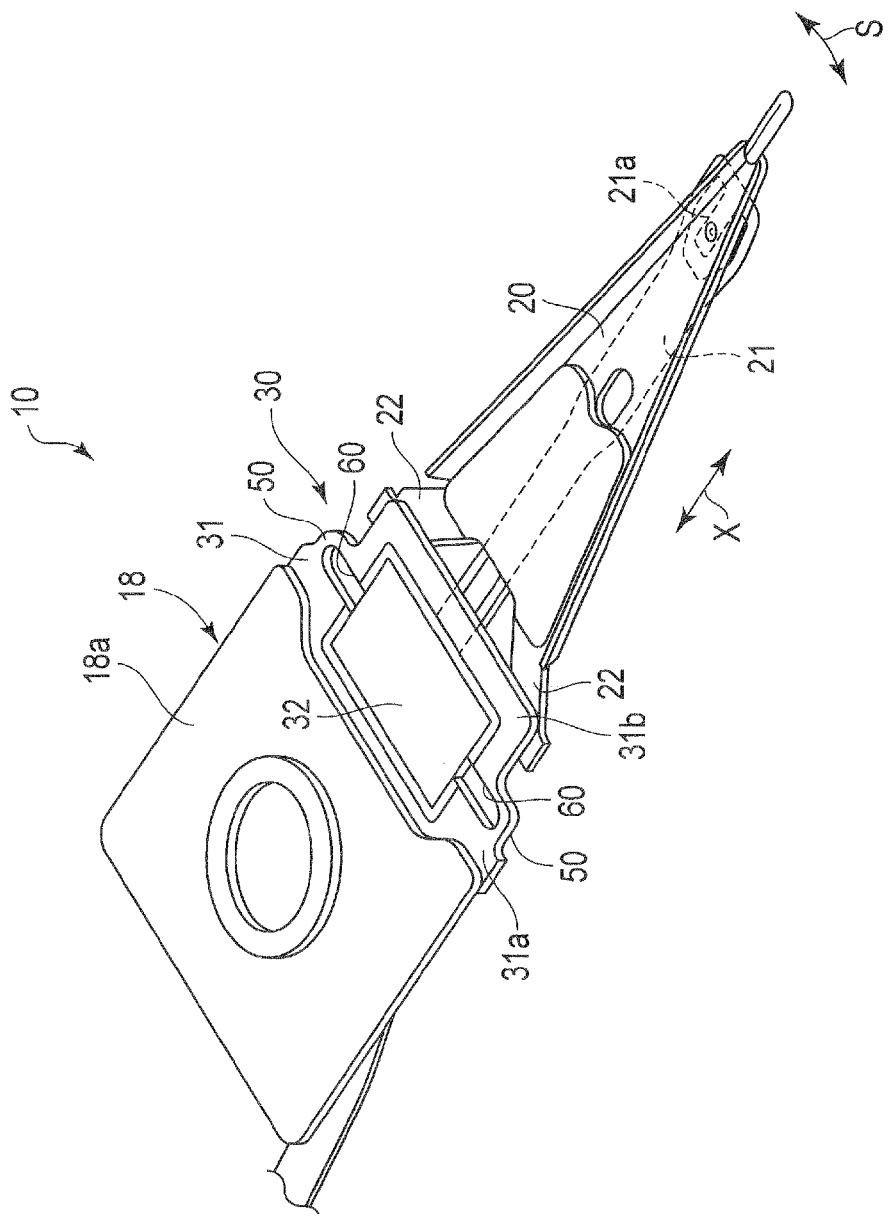
F I G. 3

Control system of HDD

Decoupled (First embodiment)

(a) Open loop    $G + H + GH$ (b) Closed loop  $\dfrac{G(1+H) + H}{(1+G)(1+H)}$ (c) Sensitivity  $\dfrac{1}{(1+G)(1+H)}$

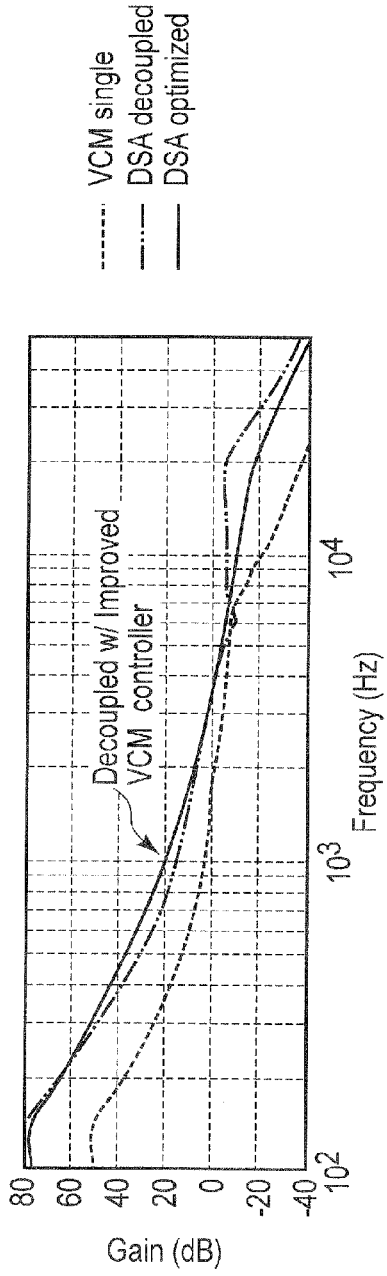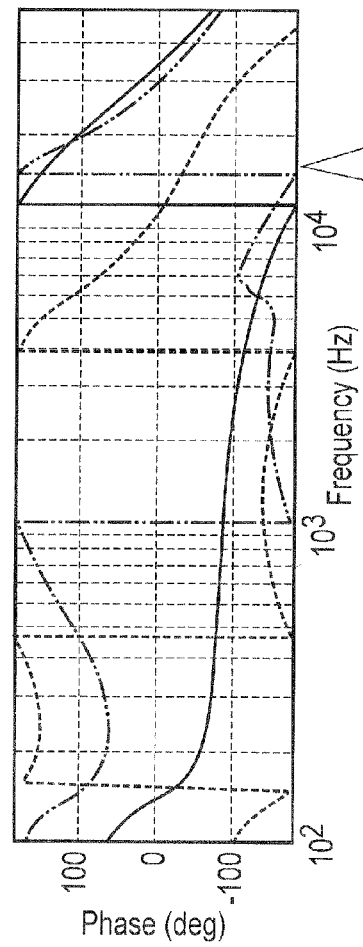
F I G. 7A
F I G. 7B

When feedback amount is varied (first embodiment)

- K = 0.4 or lower is undesirable
- K = 0.5 or greater more improves in all bands than in single use Coupled (Second embodiment)
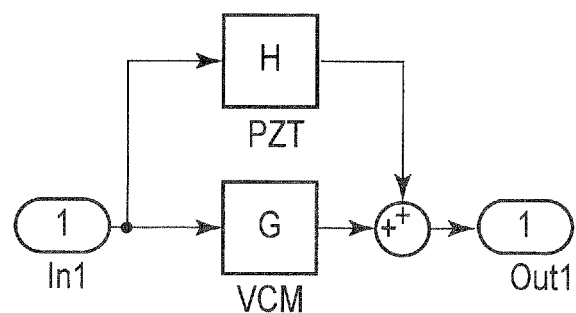
(a) Open Loop  $G + H$
(b) Closed Loop  $\dfrac{G + H}{1 + G + H}$
(c) Sensitivity  $\dfrac{1}{1 + G + H}$
F I G. 10

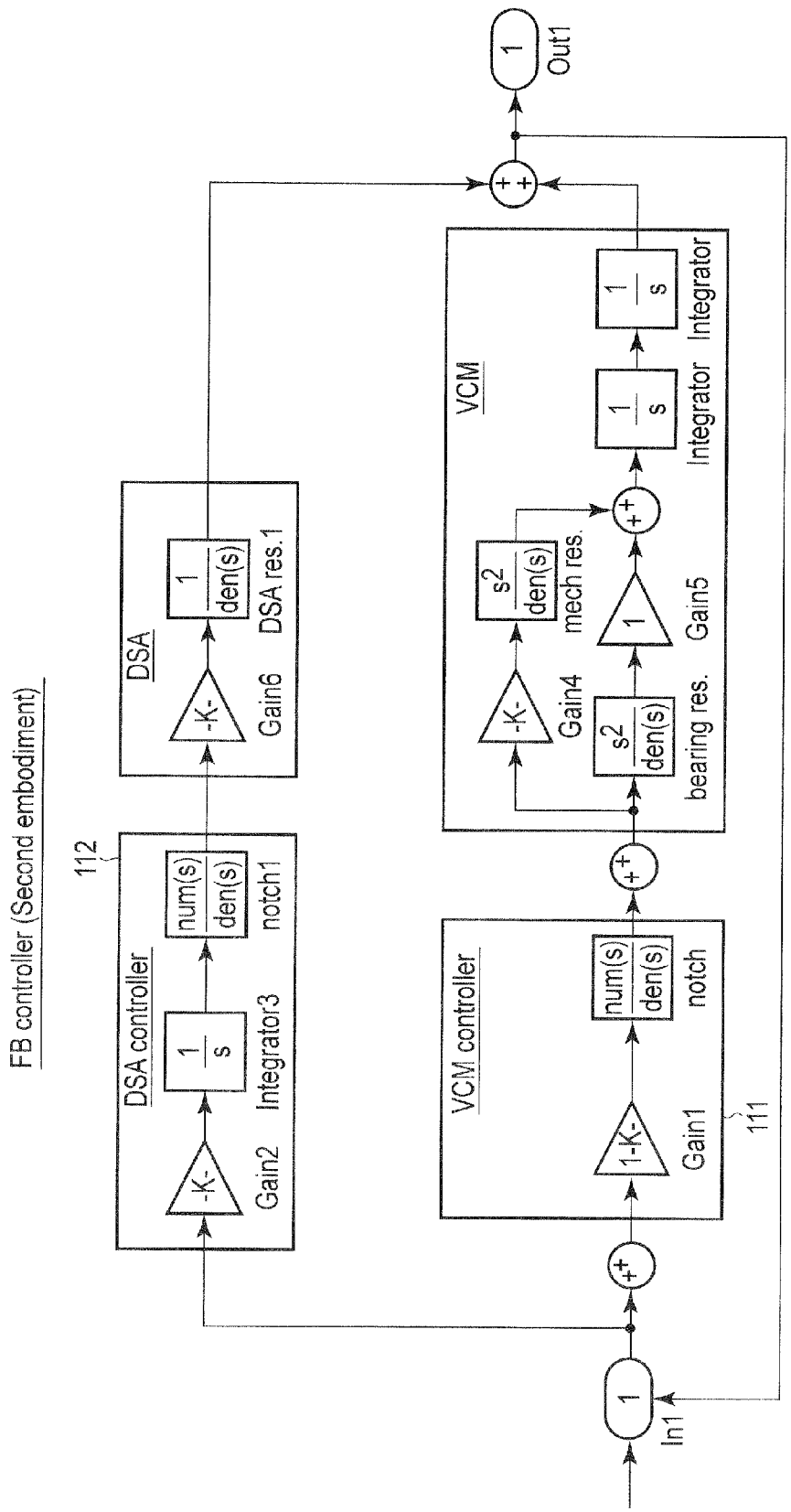
F I G. 11

DOUBLE SERVO TYPE MAGNETIC DISC APPARATUS

CROSS-REFERENCE TO RELATED APPLICATIONS

This application is based upon and claims the benefit of priority from prior Japanese Patent Application No. 2011-025079, filed Feb. 8, 2011, the entire contents of which are incorporated herein by reference.

FIELD

The embodiments described herein relate generally to a magnetic disc apparatus, e.g., a hard disc drive (HDD).

BACKGROUND

A double servo system has been proposed for use in a hard disc drive (HDD) employed in an information processing apparatus, such as a personal computer.

The double servo system is rather popularly employed in optical disc apparatuses. However, in recent magnetic disc apparatuses, track pitches are narrowed to, for example, below 10 nm. This gives rise to a background of promoting densification more highly than in optical disc apparatuses as described above, to such an extent that conventional control systems cannot respond to the densification.

In particular, popular VCM control employs a great number of filters, such as a lead lag filter (phase advance/lag compensation) and an integration compensator which obtains a gain in a low band and improves an outer disturbance property, in order to stabilize an originally unstable actuator. These filters are indispensable to a VCM. Although stabilization is unavailable without these filters, the filters easily cause a phase delay and put limitations to obtaining of higher gains, and are ineffective for improvement of an outer-disturbance compression property.

There is also a background that, even a double servo system is introduced, VCM control takes over a conventional method in many cases, and therefore, a phase margin becomes finally a bottleneck which leads to unsatisfactory results from a viewpoint of high gains.

BRIEF DESCRIPTION OF THE DRAWINGS

FIG. 3 shows an exterior of a suspension in the magnetic disc apparatus according to the first embodiment;

FIGS. 7A and 7B are graphs showing gains (Gain) and phases (Phase) in an open loop of the feedback controller according to the first embodiment;

FIG. 10 is a view for explaining control of a magnetic disc apparatus according to the second embodiment; and FIG. 11 is a view for explaining components of a feedback controller in a magnetic disc apparatus according to the second embodiment.

DETAILED DESCRIPTION

In general, according to one embodiment, a magnetic disc apparatus includes: a magnetic head which reads information stored in a magnetic disc; an arm which supports the magnetic head; a coarse actuator to move the magnetic head above the magnetic disc by driving the arm; a fine actuator to hold a position of the magnetic head; and a feedback controller which controls a feedback path which feeds back a displacement of the actuator to a target value of the coarse actuator. The feedback controller controls decoupling due to the feedback path of a double actuator system which adds up the coarse actuator and the fine actuator, by varying a feedback amount of the feedback path.

Hereinafter, an embodiment will be described with reference to the drawings.

In descriptions below, components which are common to all the drawings are respectively dented at common reference signs.

First Embodiment
1 Example Configuration
1-1 Example Exterior Configuration

An example exterior configuration of a magnetic disc apparatus according to the first embodiment will be described with reference to FIGS. 1, 2, and 3.

Figure 1:
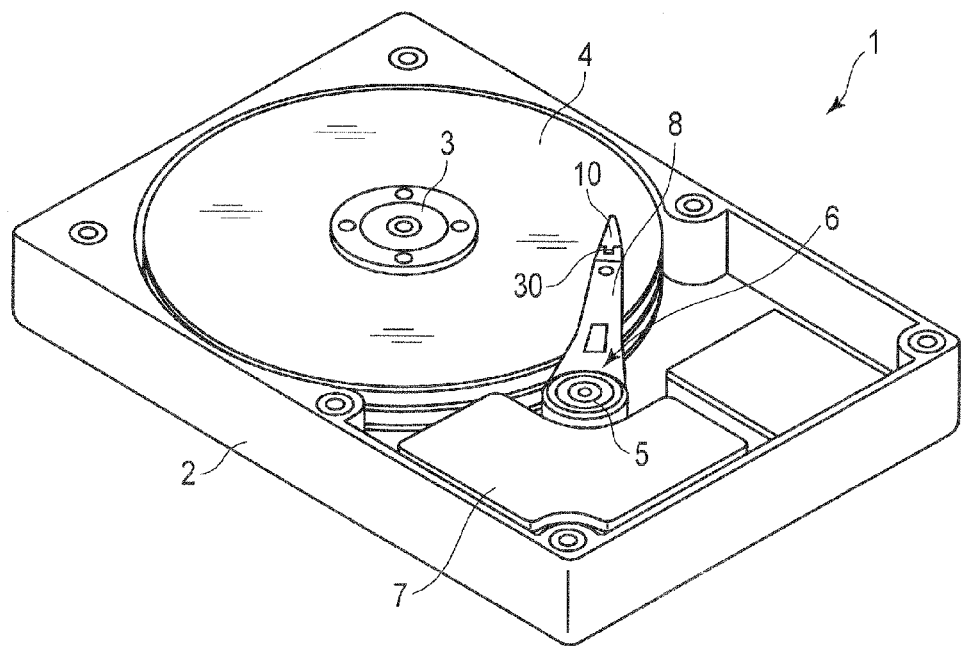
FIG. 1 is a view showing an exterior of a magnetic disc apparatus according to the first embodiment.

As shown in FIG. 1, a magnetic disc apparatus (HDD) 1 comprises a case 2, a magnetic disc 4 which rotates about a spindle 3 as a center, a carriage 6 which can be pivoted about a pivot shaft 5, and a positioning motor (voice coil motor: VCM) 7 as a coarse actuator for driving the carriage 6. The case 2 is sealed by an unillustrated cap.

Figure 2:
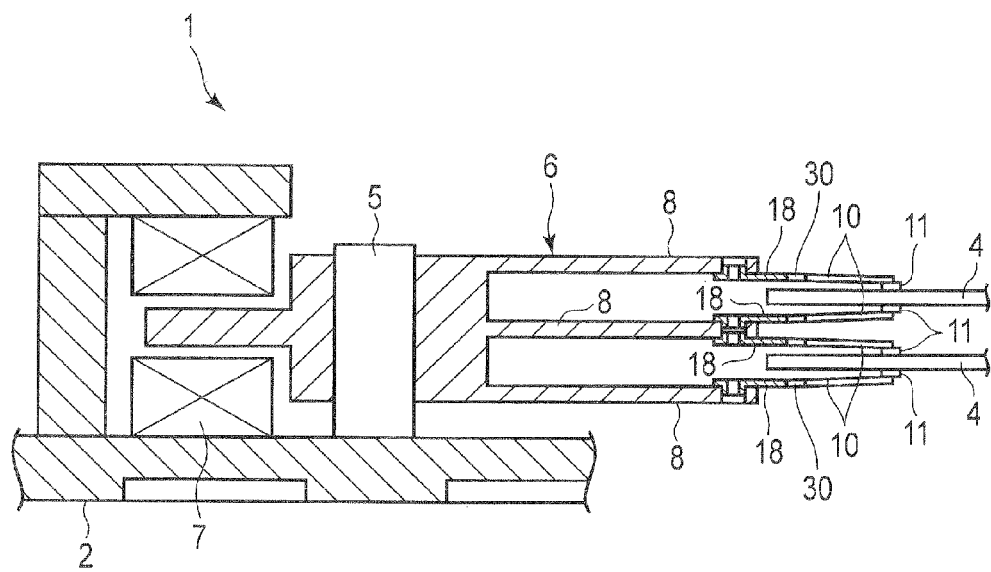
FIG. 2 is a cross-sectional view showing a cross-sectional configuration of the magnetic disc apparatus according to the first embodiment.

FIG. 2 is a cross-sectional view schematically showing a part of the magnetic disc apparatus 1. As shown in FIG. 2, an arm 8 is provided on the carriage 6. Suspensions 10 are attached to a top end of the arm 8. Sliders 11 which form a magnetic head are provided at top ends of the suspensions 10. As a disc 4 rotates at a high speed, air bearings are formed between the disc 4 and the sliders 11.

When the carriage 6 is pivoted by a positioning motor 7, the suspensions 10 move in a radial direction of the disc 4, and the sliders 11 then move to a desired track on the disc 4. Elements capable of converting an electric signal and a magnetic signal, such as magneto-resistance ("MR") elements, are provided at the end of each slider 11. Data writing into or reading from the disc 4 is performed by these elements. Thus, the positioning motor (VCM) 7 forms a coarse actuator which moves a head position of the magnetic head.

FIG. 3 shows a suspension 10 according to the first embodiment. The suspension 10 comprises a base unit 18 comprising a base plate 18a, a load beam 20, a flexure 21 (flexure with conductors), and a micro actuator mount unit 30.

The load beam 20 is fixed to the arm 8 (shown in FIGS. 1 and 2) of the carriage 6 through the base unit 18. Hinge parts 22 which can elastically bend in a thickness direction are formed at a base part (rear end) of the load beam 20. Directions denoted by an arrow X in FIG. 3 are length directions (longitudinal directions) of the suspension 10, i.e., length directions of the load beam 20. An arrow S denotes sway directions.

The flexure 21 is provided along the load beam. A part of the flexure 21 is fixed to the load beam 20 by a fixing means such as laser welding. A tongue 21a (shown in FIG. 3) which functions as a gimbal unit is formed near a top end of the flexure 21. The slider 11 described above is attached to the tongue 21a. Thus, the slider 11 of the magnetic head is provided at the top end of the load beam 20, and a head gimbal assembly is formed by the suspension 10 and slider 11.

A micro actuator element 32 made of a piezoelectric element such as PZT is mounted on the micro actuator mount unit 30. The micro actuator element (PZT) 32 forms a fine actuator which moves the head position of the magnetic head finely at a high speed.

2 Control (Double Servo System Control) Model

Next, a control model of a magnetic disc apparatus according to the present embodiment will be described. Control according to the present embodiment is to perform feedback control (FB control), i.e., double servo (dual stage servo) control which adds up the voice coil motor (VCM) for performing coarse actuation and the micro actuator (PZT) provided at a top end of the voice coil motor and allocated to fine movement to hold the head.

2-1 Control System of HDD

Figure 4:
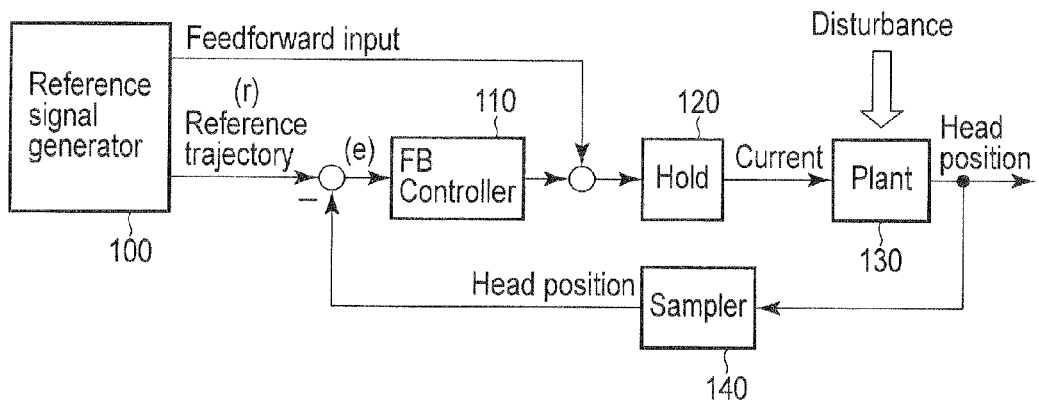
FIG. 4 is a diagram showing a control system of the magnetic disc apparatus according to the first embodiment.

At first, the control system of HDD for the magnetic head according to the first embodiment will be described with reference to FIG. 4.

As shown in the figure, the control system of the magnetic head according to the present embodiment is expressed by a reference signal generator 100, a feedback controller 110, a hold unit 120, a plant unit 130, and a sampler 140.

The reference signal generator 100 generates a reference signal (r: Reference trajectory) of a target position for the magnetic head position and a prediction signal (Feedforward input) for a disturbance.

The feedback controller (FB controller) 110 feeds back, as an output of a feedback signal which includes a disturbance, an input signal (In: displacement signal (e)) as a difference between the reference signal (r) and a position signal of the head position which is output from the sampler 140. Details of the feedback controller 110 will be described later.

The hold unit (Hold) 120 takes in the input feedback signal and the prediction signal for a disturbance, converts these signals into an electric signal (Current), and outputs the signals.

The plant unit (Plant) 130 drives the magnetic head by the electric signal as described above in response to a disturbance.

The sampler 140 takes in the position signal of the magnetic head (Head Position), and outputs this signal again to the feedback controller 110.

2-2 Sensitivity of Feedback Controller (FB Controller)

Figure 5:
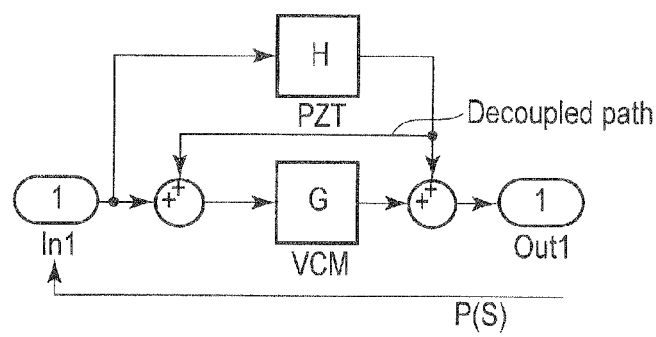
FIG. 5 is a view showing for explaining control of the magnetic disc apparatus according to the first embodiment.

Next, control of the feedback controller 110 according to the first embodiment will be described with reference to FIG. 5.

As shown in the figure, the control of the feedback controller 110 according to the present embodiment is of a double servo (dual stage servo) system which adds up the voice coil motor (VCM) G for performing coarse actuation and the micro actuator (PZT) provided at a top end thereof and allocated to fine movement to hold the head. Further, the present embodiment employs decoupled control method comprising a path (Decoupled path) which feeds back an estimated displacement of the micro actuator (PZT) H to a target value of the voice coil motor (VCM) G. Decoupling dependent on (PZT) H and (VCM) G shown in the figure is expressed as follows.

In an open loop denoted at (a), a transmission function is expressed as an expression (1) below.

$$G+H+GH \quad (1)$$

In a closed loop denoted at (b), a transmission function is expressed as an expression (2) below.

As for sensitivity denoted at (c), a sensitivity function is expressed as an expression (3) below.

$$1/((1+G)(1+H)) \quad (3)$$

As a result, the sensitivity function according to the present embodiment is expressed as a product of H and G.

2-3 Components of Feedback Controller

Next, components of the feedback controller 110 according to the present embodiment will be described with reference to FIG. 6.

As shown in the figure, the components of the feedback controller 110 are represented by a VCM controller 111, a DSA controller 112, and a feedback path (Decoupled path) 113. The DSA (Dual Stage Actuator) is the PZT element 32, and the VCM is the positioning motor (voice coil motor) 7 as described previously. These components are as shown in FIG. 6.

The VCM controller 111 controls the VCM. The VCM controller 111 comprises, as components thereof, an amplifier (Gain1) and a notch filter (notch). The amplifier (Gain1) amplifies (K) a signal input to the VCM controller 111. The notch filter (notch) notches (num(s)/den(s)) an output of the amplifier (Gain1).

Here, the (num(s)/den(s))=H(s) described above is also expressed as follows.

$$H(s)=(S^2+2k\zeta\omega S+\omega^2)/(S^2+2\zeta\omega S+\omega^2) \quad (I)$$

ζ: Parameter which determines notch width
k: Parameter which determines notch depth The DSA controller 112 controls DSA (PZT). The DSA controller 112 is represented by an amplifier (Gain2), an integrator (Integrator3), and a notch filter (Notch1), as components thereof. The amplifier (Gain2) amplifies a signal input to the DSA controller 112. The integrator (Integrator3) integrates (1/s) the output of the amplifier (Gain2). The notch filter (notch 1) notches (num(s)/den(s)) an output of the integrator (Integrator 3).

The feedback path (Decoupled path) 113 feeds back the displacement of the DSA (PZT) to the VCM controller 112. The feedback path is represented by an amplifier (Gain7), as a component thereof. The amplifier (Gain7) amplifies (K) a signal input to the VCM controller 111. In the present embodiment, desirably, a feedback amount (gainK (K times multiplication)) of the amplifier (Gain7) is variable (K=0.5 to 1.0), and K is selected to be a value described above. As described above, it is effective that the sensitivity function of the whole control system of the feedback controller 110 can achieve an excellent disturbance compression characteristic as will be described later, by selecting the feedback amount.

The DSA (PZT) is represented by the amplifier (Gain6) and resonance of the DSA (DSA res.1), as components thereof. The amplifier (Gain6) amplifies a signal (K) input to the DSA (PZT). The transmission function (DSA res.1) of the PZT is expressed as 1/den(s).

The aforementioned equation 1/den(s)=Fp described previously is expressed as an expression (II) below.

$$Fp = 1/(S^2 + 2\zeta p\omega pS + \omega p^2) \quad (II)$$

ωp: Piezoelectric resonance frequency
ζp: Piezoelectric damping coefficient

The VCM is represented by bearing resonance (bearing res.), an amplifier (Gain4), an amplifier (Gain5), resonance of mechanical parts (mech res.), an adder, an integrator (Integrator), and an integrator (Integrator1), as components thereof. The transmission function of the bearing (bearing res.) is expressed as $s^2$/den(s). The amplifier (Gain4) amplifies (K) a signal input to the VCM.

The aforementioned $S^2$/den(s)=Fb is expressed as an expression (III) below.

$$Fb = S^2/(S^2 + 2\zeta b\omega BS + \omega b^2) \quad (III)$$

ωb: Bearing resonance frequency
ζb): Bearing damping coefficient

The amplifier (Gain5) amplifies (1) an output of the transmission function of the bearing. The transmission function of mechanical parts (mech res.) is expressed as $S^2$/den(s). The adder adds up the transmission function of mechanical parts (mech res.) and the amplifier (Gain 5). The integrator (Integrator) integrates (1/s) an output of the adder. The integrator (Integrator1) integrates (1/s) an output of the integrator (Integrator).

The aforementioned $S^2$/den(s)=Fb is expressed as an expression (IV) below.

$$Fm = S^2/(S^2 + 2\zeta m\omega mS + \omega m^2) \quad (IV)$$

ωm: Mechanical resonance frequency
ζm: Mechanical bearing damping coefficient

The DSA (PZT) and the VCM are added up to form an output (Out1) of the feedback controller 110. The output (Out1) is fed back as an input (In1) to the feedback controller 110.

As described above, the feedback controller 110 according to the present embodiment can achieve an excellent disturbance compression characteristic as will be described later notwithstanding that, for example, a low pass filter (LPF) is not required as a component thereof. Other components which are considered to be conventionally required, such as the amplifier (Gain3), integrator (Integrator2), and lead lag, are desirably omitted from the feedback controller 110 according to the present embodiment.

This is because phase loss decreases since the lead lag is not required any more. As a result, a sufficient gain can be obtained in a low band.

3 Effect

At least, the same effects as features (1) to (3) described below can be obtained by the magnetic disc apparatus according to the first embodiment.

(1) Performance of a double actuator system can be extracted to the maximum and the disturbance compression characteristic can be thereby improved.

As described above, in the magnetic disc apparatus according to the present embodiment, the feedback controller 110 performs control on the double servo system which adds up the voice coil motor (VCM) to make coarse movement and a micro actuator (PZT) H provided at a top end thereof and holding the head to finely move at a high speed. Further, the present embodiment employs a decoupled control method comprising a path (Decoupled path) which feeds back an estimated displacement of the micro actuator (PZT) H to a target value of the voice coil motor (VCM) G.

Figure 6:
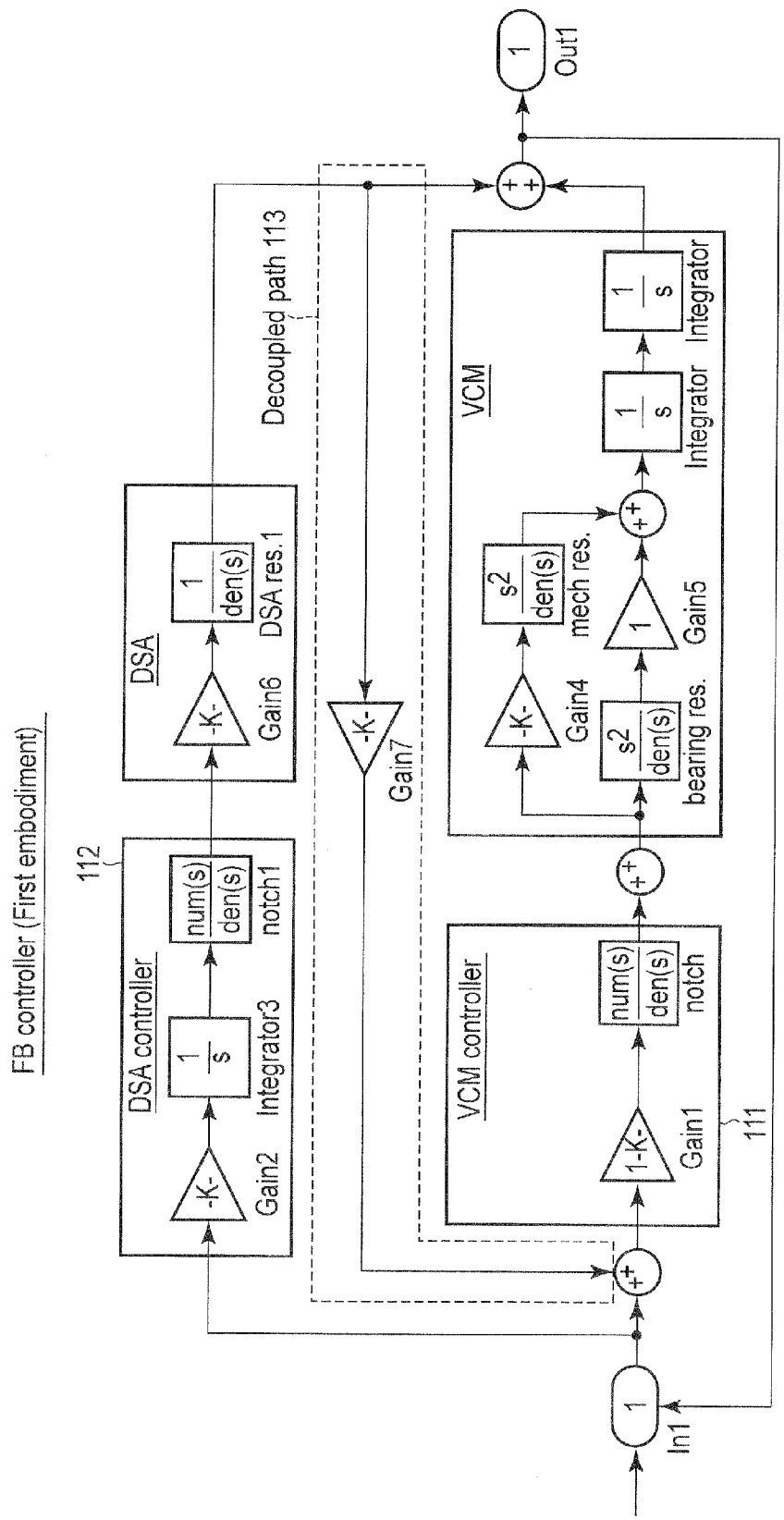
FIG. 6 is a diagram showing for explaining components of a feedback controller in the magnetic disc apparatus according to the first embodiment.

Components of the feedback controller 110 are expressed as the VCM controller 111, DSA controller 112, and feedback path (Decoupled path) 113, as shown in FIG. 6.

In the components described above, gains (Gain) and phases (Phase) in the open loop are expressed as shown in FIGS. 7A and 7B. As shown in FIG. 7A, according to the present embodiment, sufficient gains are found to be obtained in a low band even without an integrator (Integrator2) as a component of the VCM controller 111. In addition, the integrator (Integrator 3) in the DSA controller 112 is found to perform integration compensation for the control system.

In other words, as the stable DSA side is added to the side of the unstable VCM, stabilization can be achieved as a whole, independently from presence or absence of the decoupled path in actual. The DSA can be said to operate as a stable device.

As shown in FIG. 7B, a phase margin can be set to substantially 90 degrees by removing compensation by, for example, the low pass filter (LPF), amplifier (Gain 3), integrator (Integrator 2), and lead lag (Lead Lag).

Figure 8A:
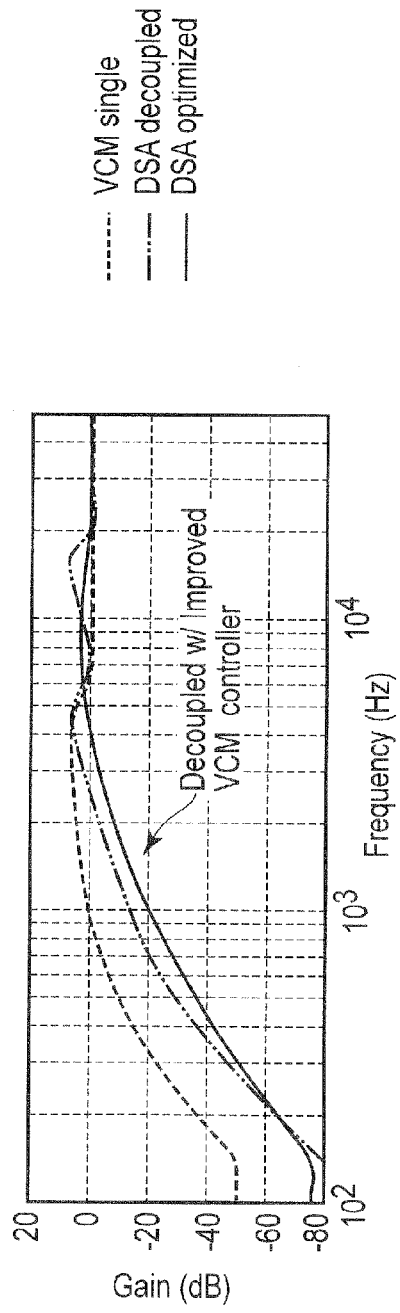
FIGS. 8A and 8B are graphs showing gains (Gain) and phases (Phase) concerning sensitivity of the feedback controller according to the first embodiment.
Figure 8B:
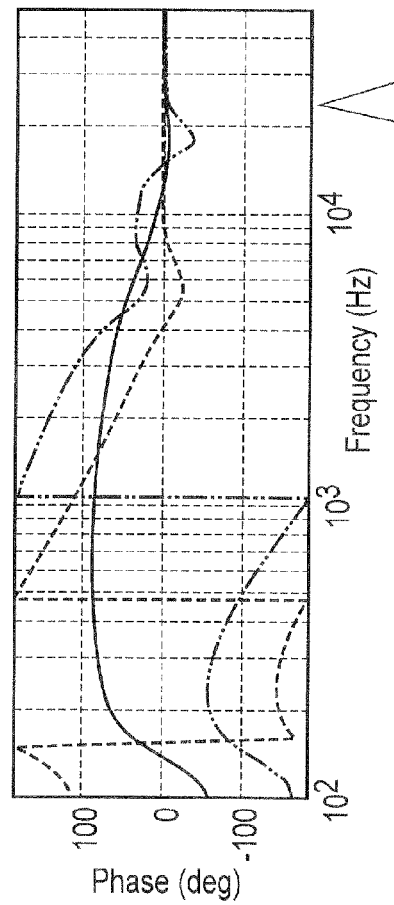

The gains (Gain) and phases (Phase) of the sensitivity function of the components are represented As shown in FIGS. 8A and 8B. As shown in FIG. 8A, according to the present embodiment, a peak in a high band can be reduced to be very small even without, for example, the integrator (Integrator2) as a component of the VCM controller 111.

As also shown in FIG. 8A, for example, improvement by 5 dB or so can be achieved compared with the prior art, in a middle band where a number of disturbances occur.

As described above, the components according to the present embodiment can extract maximum performance from the double actuator system, and can accordingly improve the disturbance compression characteristic.

In other words, in the first embodiment, the VCM is designed to be unstable in single use, and the entire feedback control system is stabilized by the DSA controller 112 of the PZT control system. In still other words, the first embodiment can be said to relate to decoupled control which performs integration compensation for the entire double servo system including the DSA controller 112 and the VCM controller 111 without a compensator or any other component.

(2) Optimum values can be obtained depending on types of disturbances by optimally varying the feedback amount of the feedback path (Decoupled path) 113.

In the present embodiment, desirably, the feedback amount (gain K (K times multiplication)) of the amplifier (Gain7) as a component of the feed 113 is variable (K=0.5 to 1.0), and K is selected to be a value as described above.

As described above, it is effective that the sensitivity function of the whole control system of the feedback controller 110 can achieve an excellent disturbance compression characteristic by selecting the feedback amount.

Figure 9A:
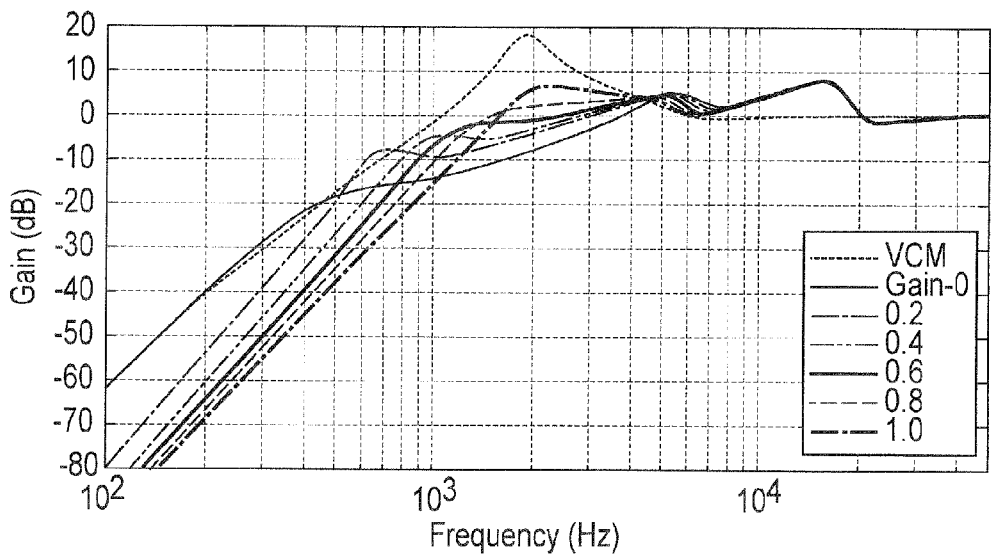
FIGS. 9A and 9B are graphs showing characteristics when a feedback amount of the feedback controller according to the first embodiment is changed.
Figure 9B:
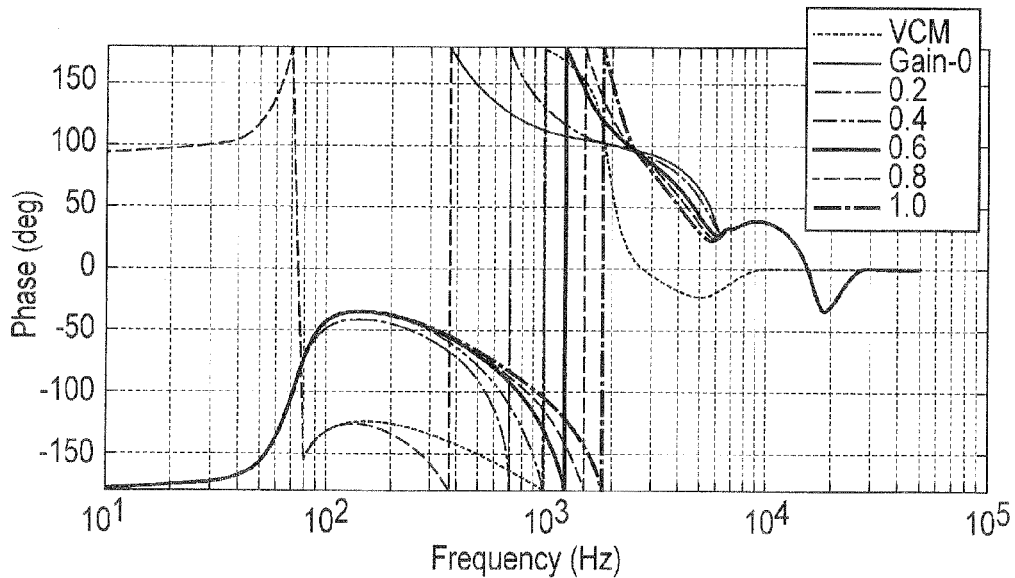

For example, where the feedback amount (gain K (K times multiplication)) of the amplifier (Gain7) as a component of the feed 113 is variable (K=0.0 to 1.0), gains (Gain) and phases (Phase) compared with single use (of the VCM) are as shown in FIGS. 9A and 9B.

As shown in FIGS. 9A and 9B, it is not desirable that the feedback amount of the amplifier (Gain7) as a component of the feedback path 113 is not greater than −K=0.4.

On the other side, the disturbance compression characteristic can be improved more in all bands when the feedback amount of the amplifier (Gain7) as a component of the feedback path 113 satisfies −K=0.5 to 1.0 than in single use (of the VCM).

In addition, which feedback amount of the amplifier (Gain7) is selected from −K=0.5 to 1.0 may be determined by selecting optimal values depending on types of disturbances. In this respect, the feedback amount of the amplifier (Gain7) as a component of the feedback path 113 may be configured to be variable, and the feedback amount (K) may be switched during operation of the magnetic disc apparatus, to perform more optimal control. To detect a disturbance, an output of an acceleration sensor provided separately in a body of the magnetic disc apparatus may be used.

More specifically, an example of a feedback amount (K) selected depending on a type of disturbance is desirably a value described below, for example.

For example, a feedback amount of the amplifier (Gain7) is desirably set to K=1 during seeking. This is a countermeasure for disc flutter.

For example, during ordinary on-tracking, the feedback amount of the amplifier (Gain7) is desirably set to K=0.5 to 0.7. This is a countermeasure to solve disc flatter.

For example, when a disturbance in a low band like vibration of a case is detected, the feedback amount of the amplifier (Gain7) is desirably set to K=0.8 to 1.0.

A final value of K is not limited to the foregoing values but may be finely adjusted and optimized for each setting of the magnetic disc apparatus.

Thus, according to the present embodiment, optimum values can be obtained depending on types of disturbances by optimally varying the feedback amount of the feedback path (Decoupled path) 113.

(3) Phase loss decreases, and as a result, sufficient gains can be obtained in a low band.

Also in the present embodiment, implementation of the lead lag (Lead Lag) is actively avoided, and phase loss is therefore reduced since no lead lag is required any more. Sufficient gains are found to be obtained in a low band, as a result. Therefore, the lead lag had better be removed.

Second Embodiment (Example of Coupled Control)

Next, a magnetic disc apparatus according to the second embodiment will be described with reference to FIGS. 10 and 11. The second embodiment relates to an example configuration of coupled control in which the feedback path 113 described above is not provided. From descriptions below, detailed descriptions of parts which overlap descriptions of the first embodiment will be omitted.

Sensitivity of Feedback Controller (FB Controller)

At first, control of a feedback controller 110 according to the second embodiment will be described with reference to FIG. 10.

As shown in the figure, control of the feedback controller 110 according to the present embodiment is achieved by a double servo system (Dual Stage Servo) which adds up the voice coil motor (VCM) to perform coarse movement and a micro actuator (PZT) H provided at a top end thereof and holding the head to perform fine movement at a high speed. Further, the present embodiment employs a coupled control system which does not include the feedback path 113 described above. Therefore, the coupled system based on H (PZT) and G (VCM) shown in the figure is expressed as follows.

In an open loop denoted at (a), sensitivity is expressed as an expression (4) below.

$$G+H \quad (4)$$

In a closed loop denoted at (b), sensitivity is expressed as an expression (2) below.

$$(G+H)/(1+G+H) \quad (5)$$

Sensitivity denoted at (c) is expressed by an expression (6) below.

$$1/(1+G+H) \quad (6)$$

As a result, the sensitivity in coupling in the second embodiment is expressed by using a sum of G and H.

Components of Feedback Controller

Next, components of the feedback controller 110 according to the second embodiment will be described with reference to FIG. 11.

As shown in the figure, the components of the feedback controller 110 according to the second embodiment differ from those of the first embodiment in that the feedback path 113 described previously is not provided.

Also, the feedback controller 110 according to the present embodiment does not require, for example, a low pass filter (LPF) as a component thereof. Similarly, the feedback controller 110 according to the present embodiment does not require, for example, an amplifier (Gain 3), an integrator (Integrator2), or a lead lag (lead lag), either.

Operation and Effect

The magnetic disc apparatus according to the second embodiment can achieve at least the same effect as described above concerning the feature (1).

Components of the feedback controller 110 according to the second embodiment are effective since control is simplified because of no need to provide the feedback path 113 as described.

Further, the configuration as employed in the present embodiment can be applied upon requirement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic disc apparatus comprising:
    a magnetic head which reads information stored in a magnetic disc;
    an arm which supports the magnetic head; and
    a feedback controller which comprises:
        a coarse controller configured to control a coarse actuator to move the magnetic head above the magnetic disc by driving the arm,
        a fine controller configured to hold a position of the magnetic head, and
        a feedback path which feeds back a displacement of a fine actuator to a target value of the coarse actuator,
    wherein the feedback controller controls decoupling due to the feedback path of a double actuator system which adds up the coarse actuator and the fine actuator,
    wherein the coarse controller comprises a first amplifier which amplifies a signal input to the coarse controller and a first notch filter which notches an output of the first amplifier, and wherein the coarse controller does not comprise a phase compensator, and
    wherein the fine controller comprises a second amplifier which amplifies a signal input to the fine controller, an integrator which integrates an output of the second amplifier, and a second notch filter which notches an output of the integrator.

2. The apparatus of claim 1, wherein the feedback controller further comprises, as a component thereof, a third amplifier which amplifies the displacement of the fine actuator and feeds back the displacement of the fine actuator to the target value of the coarse actuator, wherein a feedback value (K) of the third amplifier is variable.

3. The apparatus of claim 2, wherein the feedback value (K) of the third amplifier is K=0.5 to 1.0.

4. The apparatus of claim 1, wherein the coarse controller does not comprise any of a low pass filter, an integrator, and a lead lag filter.

5. A magnetic disc apparatus comprising:
- a magnetic head which reads information stored in a magnetic disc;
- an arm which supports the magnetic head; and
- a feedback controller which controls a coarse actuator to move the magnetic head above the magnetic disc by driving the arm, and a fine actuator to hold a position of the magnetic head,
- wherein the feedback controller controls coupling of a double actuator system which adds up the coarse actuator and the fine actuator, and
- wherein the feedback controller comprises, as components thereof:
  - a coarse controller which controls the coarse actuator, and which comprises a first amplifier that amplifies an input signal and a first notch filter that notches an output of the first amplifier, wherein the coarse controller does not comprise a phase compensator, and
  - a fine controller which controls the fine actuator, and which comprises a second amplifier that amplifies an input signal, an integrator that integrates an output of the second amplifier, and a second notch filter that notches an output of the integrator.

6. The apparatus of claim 5, wherein the coarse controller does not comprise any of a low pass filter, an integrator, and a lead lag filter.

* * * * *